(12) United States Patent  (10) Patent No.: US 9,074,927 B2
Singh et al.  (45) Date of Patent:  Jul. 7, 2015

(54) METHODS FOR NON-DESTRUCTIVELY EVALUATING A JOINED COMPONENT

(71) Applicants: HONEYWELL INTERNATIONAL INC., Morristown, NJ (US); VIBRANT CORPORATION, Albuquerque, NM (US)

(72) Inventors: Surendra Singh, Chandler, AZ (US); Frederick William Vensel, Gold Canyon, AZ (US); Leanne Jauriqui, Albuquerque, NM (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 345 days.

(21) Appl. No.: 13/653,227

(22) Filed: Oct. 16, 2012

(65) Prior Publication Data

US 2014/0102200 A1 Apr. 17, 2014

(51) Int. Cl.
*G01H 13/00* (2006.01)

(52) U.S. Cl.
CPC ..................................... *G01H 13/00* (2013.01)

(58) Field of Classification Search
CPC ........................................................ G01H 13/00
USPC ................. 73/582, 598, 599, 602, 659, 579
See application file for complete search history.

(56) References Cited

U.S. PATENT DOCUMENTS

| 2,984,903 | A | * | 5/1961 | Dixon et al. ................ 228/234.1 |
| 3,680,200 | A | * | 8/1972 | Terrill et al. .................. 228/111 |
| 4,231,259 | A | * | 11/1980 | Thiruvengadam et al. ...... 73/584 |
| 4,419,562 | A | | 12/1983 | Jon et al. |
| 4,428,235 | A | * | 1/1984 | Sugiyama ........................ 73/574 |
| 4,603,584 | A | | 8/1986 | Bartle et al. |
| 5,106,012 | A | * | 4/1992 | Hyzak et al. ................... 228/265 |
| 5,581,037 | A | * | 12/1996 | Kwun et al. ..................... 73/623 |
| 5,902,935 | A | * | 5/1999 | Georgeson et al. ............. 73/801 |
| 6,199,431 | B1 | | 3/2001 | Nath et al. |
| 6,640,632 | B1 | * | 11/2003 | Hatanaka et al. ............... 73/598 |
| 6,920,792 | B2 | | 7/2005 | Flora et al. |
| 7,199,367 | B2 | | 4/2007 | Favro et al. |
| 7,850,056 | B2 | * | 12/2010 | Nasu et al. ................. 228/110.1 |
| 7,938,007 | B2 | | 5/2011 | Huebler et al. |
| 2010/0190026 | A1 | | 7/2010 | Wallace et al. |
| 2011/0257903 | A1 | | 10/2011 | Imbert et al. |

FOREIGN PATENT DOCUMENTS

| JP | 2005351660 | * 12/2005 |
| WO | 2012010863 A1 | 1/2012 |

OTHER PUBLICATIONS

Bono, R. W., et al.; Automated Resonant Inspection to Validate Resonant Frequency Characteristics within Brake Components for Improved NVH Performance, 2011 SAE International, 2010-01-1699.

* cited by examiner

*Primary Examiner* — J M Saint Surin
(74) *Attorney, Agent, or Firm* — Ingrassia Fisher & Lorenz, P.C.

(57) ABSTRACT

A method for non-destructively evaluating a joined component includes inducing vibrations in the joined component within a range of frequencies, acquiring a resonance spectra from the joined component resulting from the induced vibrations, and analyzing the resonance spectra using Acoustic Sensor Testing (AST).

13 Claims, 6 Drawing Sheets

METHODS FOR NON-DESTRUCTIVELY EVALUATING A JOINED COMPONENT

TECHNICAL FIELD

The disclosed embodiments generally relate to non-destructive evaluation (NDE) methods. More particularly, the disclosed embodiments relate methods for non-destructively evaluating a joined component.

BACKGROUND

Metal joining methods play prominent roles in metallic component fabrication technology because virtually all such products are fabricated by joining procedures that require joint integrity that equals or surpasses component integrity. This field is extremely broad, involving many disciplines in science and engineering, a myriad of metals, alloys, composites, ceramics, and design criteria. The solid state joining technologies represent large categories of manufacturing processes including, but not limited to, bonding, brazing, and welding. Typically, welding can include arc welding, electron beam welding, diffusion bonding, chemical vapor deposition, adhesive bonding, fusion bonding, soldering, brazing, and friction welding. Originally developed on an empirical basis, these methods are accepted in today's manufacturing practices, though both products and processes often fail to meet the design criteria.

The design criteria require a process that is capable of manufacturing a joint to a level of integrity that meets or exceeds component structural integrity when introduced to field applications. For a successful joining process, surfaces to be joined must be prepared so that they are compatible to each other, both chemically and mechanically. Even when satisfactory joining processes are devised, subsequent performance is often limited due to structural alterations that occur during the joining processes and concomitant degradation of engineering properties thereafter. Typical joining problems are associated with surface preparation, pressure, temperature, and filler metals and often require some means for monitoring any significant degradation in the product integrity. Historically both destructive and non-destructive evaluation (NDE) methods have been used to study structural integral integrity under varying manufacturing variables and for different joining processes: 1) solid state joining, 2) liquid state joining, 3) fusion joining, and 4) atomic joining. However, use of destructive methods is applied to study product integrity is time-consuming and cost-prohibitive and provides planar instead of volumetric view. Similarly, NDE methods have been used to a large number of parts but with limited successes.

The selection of a NDE method for inspecting welded, brazed, and/or soldered structures or monitoring the nature of the metal joining practices depends on a number of variables. Some of these are: 1) nature and location of discontinuities, 2) accessibility and environment, 3) type of materials, 4) detection capabilities, 5) skills and training of operators, and 6) economic considerations. Several NDE methods, including radiography, eddy current, penetrant inspection, thermal, and ultrasonic have been used. Each method's success varies. For example, conventional radiography is not suitable for detecting extremely small defects. Penetrant has been found useful for cracks open to the surface and does not provide any data on volumetric inspection. Similarly, ultrasonic offers both subsurface and volumetric inspections but if suffers from poor sensitivity when detecting tightly held bonded structures (difference between intimate contact and diffusion bond). A reliable NDE method for inspecting and monitoring metal joint structures and processes is desirable.

A comparatively new emerging NDE technology is known as Acoustic Sensor Testing (AST) that is based on Non-Linear Acoustics (NA). Non-Linear Acoustics provides the most suited and powerful means for evaluating the mechanical integrity of a part as NA is directly related to its interactions with mechanical and material properties of the part. NA may use low frequency that possesses low attenuation and diffraction and provides sensitivity comparable to high frequency. In that in contrast to conventional ultrasonic, which is sensitive to the presence of gross defects or open cracks, NA is sensitive is sensitive in terms of wave-propagation characteristics to micro-crack, micro-porosity, and/or any mechanical degradation. Typically, when a sinusoidal wave (tone-burst and/or gated or any other forms) propagates through a joined or solid medium, it distorts and generates a higher harmonics of the fundamental waveform, and resonant frequency shift mode as a result of the non-linearity of the propagation medium. Waveform distortion does not depend on frequency; both low frequency and high frequency generates distortion. The generation of higher harmonics due to presence of non-linearity of the propagation medium is known as NA. NA has been used extensively in power, aerospace, and automotive industries. Depending on the accessibility, one can deploy different combinations, including but not limited to driving the part in pulse-echo, through transmission, and whole body vibration using either gated sine wave (example 5 MHz with 5 cycles) or sweeping with burst sine wave. In all these case, Non-linearity Acoustic will be used. Currently, there is no industry standard for NA but there are enough materials available to those having ordinary skill in the art. Besides, ASTM E234-10 may also serve some basis for this approach, though analytical tools proposed in it is widely differ from the one proposed in this invention.

In light of the above-noted deficiencies in the art, it would therefore be desirable to provide improved NDE methods. Furthermore, other desirable features and characteristics of the present invention will become apparent from the subsequent detailed description of the invention and the appended claims, taken in conjunction with the accompanying drawings and this background of the invention.

BRIEF SUMMARY

Methods for acoustic sensor monitoring of solid state joining processes are disclosed herein. In an exemplary embodiment, a method for non-destructively evaluating a joined component includes inducing vibrations in the joined component within a range of frequencies and studying part's response in variety of ways, including harmonics, power spectrum, polarity of waveform, power spectrum, bispectrum, bicohence spectrum, pattern analysis criteria, Fast Fourier Frequency (FFT), and other features in AST.

In another exemplary embodiment, a method for non-destructively evaluating a sample joined component includes acquiring waveforms of a first plurality of joined components that include at least one joining flaw and of a second plurality of joined components that do not include joining flaws, studying the pattern analysis criteria based on waveform and propagation characteristics from the first and second plurality of joined components using Acoustic Sensor Testing (AST) to differentiate the waveforms and pattern analysis criteria (WAC) of joined components that include a flaw and joined components that do not include a flaw, and comparing a of a sample joined component against the analyzed WAC to determine whether the sample joined component includes a flaw.

In yet another exemplary embodiment, a method for non-destructive evaluation of a solid state joined component includes providing a plurality of acoustic sensors along a solid state joint of the joined component, inducing vibrations in the joined component within a range of frequencies, sensing different vibrations frequencies of the induced vibrations using the plurality of acoustic sensors, and analyzing the waveform features including higher harmonics and frequencies using AST.

This brief summary is provided to introduce a selection of concepts in a simplified form that are further described below in the detailed description. This brief summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Any embodiment described herein as "exemplary" is not necessarily to be construed as preferred or advantageous over other embodiments. Furthermore, there is no intention to be bound by any theory presented in the preceding background or the following detailed description.

In order to ensure the structural integrity of solid state joining processes, it is beneficial to employ a monitoring process during manufacturing thereof to proactively detect defects such as lack of bonding, cracks, or foreign inclusions. Currently, no conventional NDE method is capable of adequate inspection of solid state joining processes. Embodiments of the present disclosure, therefore, are directed to a novel NDE method capable of inspecting solid state joining processes using a novel acoustic sensor monitoring procedure, thereby making sure that no unacceptable anomalies are present in the joined region of the manufactured component.

NA NDE systems are comprised of hardware and software capable of inducing vibrations, recording part response to the induced vibrations, and executing analysis of the data collected. Inputting a tone burst signals, gated sine waves, and swept sine wave into the part has proven to be an effective means of introducing mechanical vibration, and can be achieved with a high quality signal generator coupled with an appropriate active transducer in physical contact with the part. Collection of the part's acoustic response can be achieved by recording the signal generated by an appropriate passive vibration transducer. The software required to analyze the available data may include a variety of suitable statistical analysis and pattern recognition tools.

A desired wave signal generator and response measurement system operating over the desired frequency range of the test part are provided. The signal generator should be calibrated to applicable industry standards, noted above. Transducers may or may not be operable over same frequency range. One to three transducers are typically used either pulse-echo or through transmission mode. However, one can use more than three transducers for acquiring part vibration response and analyzing subsequently. Transducers typically operate in a dry environment, providing direct contact coupling to the part under examination. However, non-contacting response methods can operate suitably when parts are wet or oil-coated. Other than fixturing and transducer contact, no other contact with the part is allowed as these mechanical forces dampen certain vibrations. For optimal examination, parts should be placed precisely on the transducers as desired by vibration modes (examples—generally, ±0.062 in. (1.6 mm) in each axis provides acceptable results). The examination nest and cabling shall isolate the Drive from Receive signals and ground returns, so as to not produce (mechanical or electrical) cross talk between channels.

Driving frequencies are determined by size and shape of parts, nature and characteristics of joint regions as well as the dimensions and material properties of joined component. For example, for studying a highly thin bond, one needs high frequency. For studying whole body vibrations, one can use a widely-known formula: $f_r \sim SQRT(k/m)$; where $f_r$=resonant frequency; k=stiffness (elastic properties e.g., Young's Modulus); and m=mass (dimensions, density). Structural defect strength reduction caused by degraded material properties or dimensional variation e.g., a crack reduces stiffness and lowers the resonant frequency, which can be observed on the output signal. Similarly, presence of small micro-cracks, structural anomalies, or degraded bond region can distorts output response and thereby introduces additional harmonics. Also, bonded regions with micro-pores and/or -cracks transmits only compression waves and therefore output waveform may appear to be positive rectified.

The proposed system uses one transducer that excites the component uses either tone burst or gated signals through a range of frequencies from a few hundred Hz to over 20 MHz, depending on a part's size and elastic properties. The same or/and additional transducers then measure the output response of the component to the excitation. The inspection process requires only seconds to few seconds to accomplish for individual component parts and to several minutes for more complex assemblies. The NA has the ability to carry out a superior inspection with and without no paint stripping, no chemicals, and with no sensitivity to paint chips or surface cleanliness. Eliminating the labor intensive cleaning processes and subjective inspection can save hours on a given inspection routine. The hardware measures the FFT, harmonics, shift in frequency mode, changes in waveform and other features; and the software analyzes the resonance pattern to determine the structural integrity of the part. The software is based on a known technique, Waveform Analysis Criteria (WAC), and uses generic pattern recognition algorithms and is able to detect relevant frequency shifts that occur when the part's material properties change due to work hardening, cracking, material loss, or other defects.

AST uses patented generic pattern recognition algorithms or in-house tools or both to develop sorting modules that evaluate the frequency responses of tested components. With the sorting modules developed the software eliminates the need for costly training of technicians because the algorithms make the real-time assessment of the part not the technicians.

AST algorithms contain built-in pattern recognition which performs data analysis while the software's cross-validation capability compares patterns with those in the part database. AST algorithms optimize the number of features necessary for part evaluation. Further, they provide optimization and selects relevant features for detection of desired defects. Additionally, they can compensate for normal part variations by using only selected features sensitive to the typical defects encountered.

The NDE approach disclosed herein is based on NA, and AST offers a wide range inspection wherein an external transducer driven by tone burst, gated, and wept sine wave is used to excite a part. One or more other sensors are used to capture part's vibration responses. The AST method acquires metallic and non-metallic part's waveform and frequency pattern difference that is used to identify parts with anomalies causing deficiencies in the expected performance of the part in service. This practice is intended for use with instruments capable of exciting, measuring, recording and analyzing multiple whole body mechanical vibrations within parts exhibiting acoustical ringing in the audio or ultrasonic, or both resonant frequency ranges. AST is used in the presence of manufacturing process variance to distinguish acceptable parts from those containing significant anomalies in physical characteristics expected to significantly alter the performance. Such physical characteristics include but are not limited to cracks, voids, porosity, shrink, inclusions, discontinuities, grain and crystalline structure differences, density related anomalies, heat treatment variations, material elastic properties differences, residual stress and dimensional variations.

Figure 1:
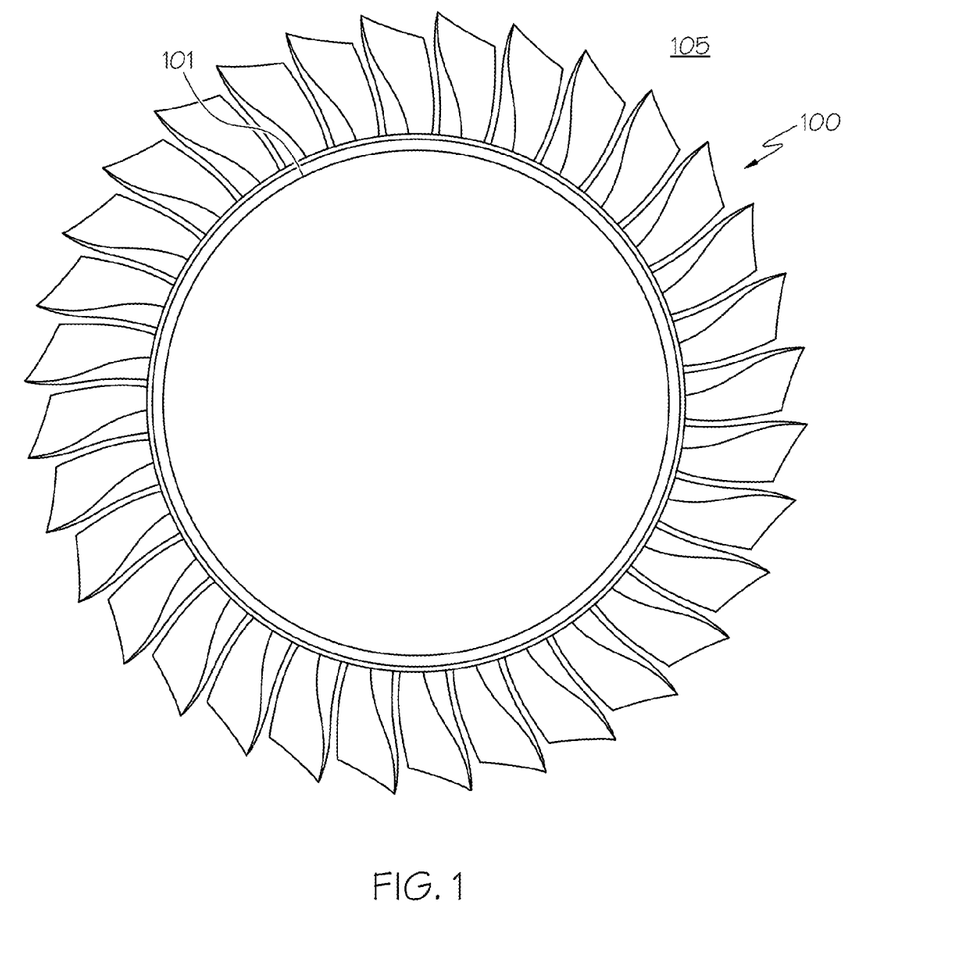
FIG. 1 depicts a top view of an exemplary NDE implementation on a bladed disk.
Figure 2:
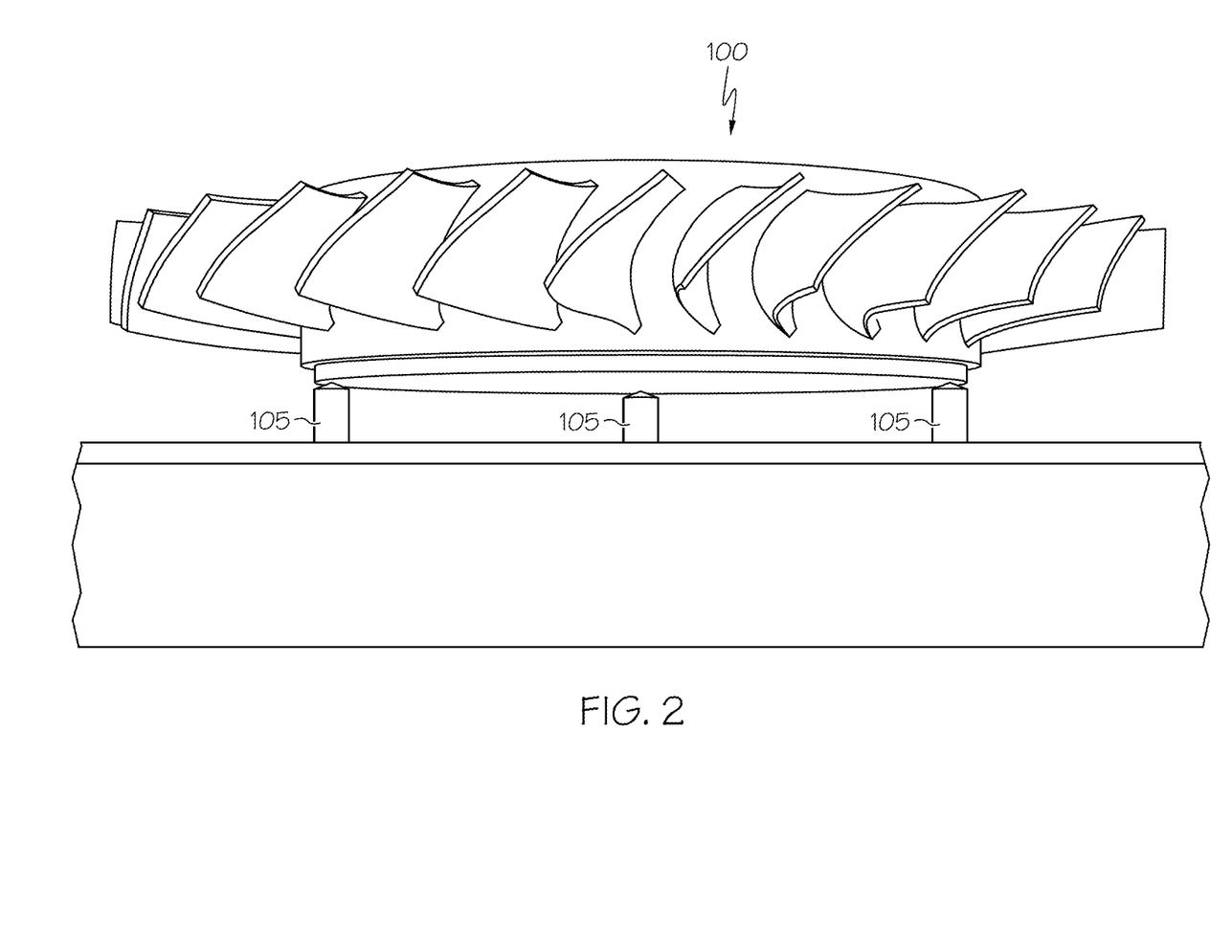
FIG. 2 depicts a side of the exemplary NDE implementation shown in FIG. 1.

In one embodiment, with reference to an exemplary bladed disk "BLISK" 100 for use in turbo-machinery, the basic NDE setup is provided with reference to FIGS. 1 (top view) and 2 (side view). The positioning of the sensors is noted at locations 105, along solid state joint 101.

The sensors positioning can vary depending on the application and can be place from top or along the circumference. Resonant pattern differences are completed using such parameters as frequency shift, split in frequency, waveform shape, power spectrum, bispectrum, co-spectrum, FFT, Quality Factor, bandwidth at +/−3 dB or any other gain level. The characteristic of output response obtained from a part depend largely on its structural integrity in addition to its mass and density as discuss earlier in this document. In addition, it depends on shape and size of the part. For example, it has been observed the shift in frequency is related to the change in young modulus and density, dimensions, or any other structural changes, which in turn, may be due to the presence of porosity, micro-pores, micro-cracks, inclusions, microstructure changes, grain size variation, heat treatment, and dimensional changes. Split in frequency has been mostly observed due to presence of cracks or combination of other anomalies. And the widening of waveform has been reported due to the mechanical loss in the part. The latter is based on the hypothesis that any part subjected to an external driver/vibrator can be treated as a mechanical vibrator and the resultant waveform is explicitly related to the mechanical quality factor (Q). Wide bandwidth equals a low Q or high loss and vice versa as often noted in ultrasonic transducers. Using the presently disclosed NDE methodology, the evaluation process is a faster, cheaper, cleaner, and operator independent, and a such provides an NDE method that determines the structural integrity, including presence of different kinds of anomalies.

Figure 3:
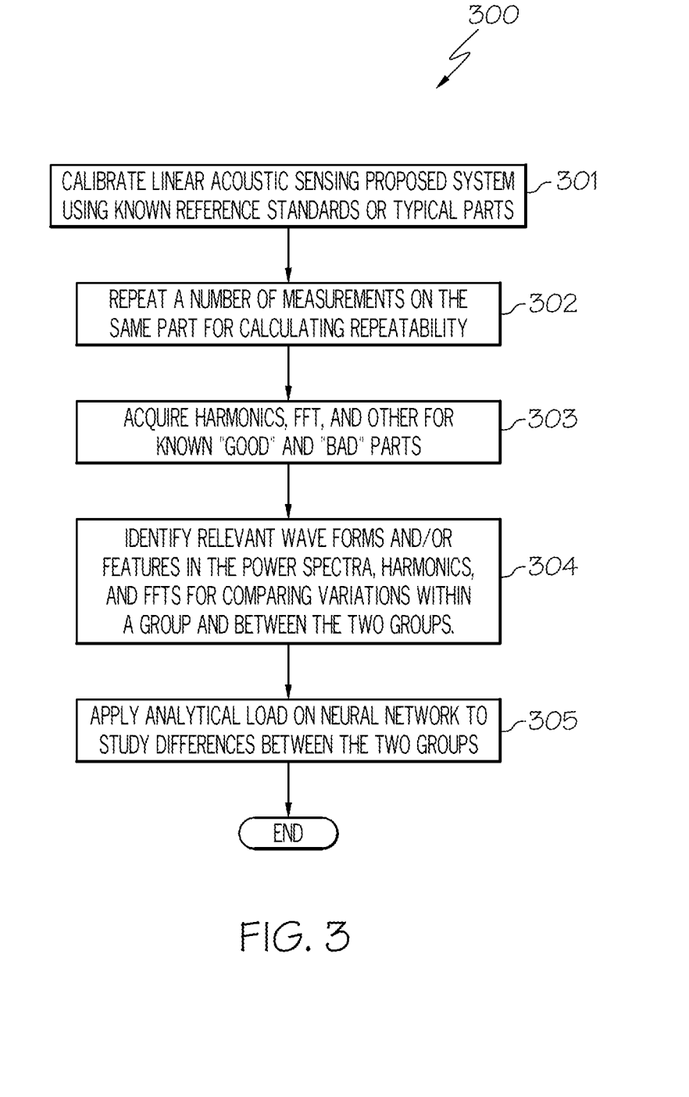
FIG. 3 is a flow chart setting forth an NDE method in accordance with one embodiment of the present disclosure.

The presently disclosed methodology, in one embodiment, is described with regard to FIG. 3 (method 300). Prior to beginning the method, a variety of known "good" and "bad" joined devices should be acquired for testing purposes. Method 300 begins with a step 301 of calibrating the AST setup with known reference standards or typical parts. Method 300 continues with a step 302 of repeating a number of measurements, for example thirty measurements, on the same part for calculating repeatability. Method 300 further includes a step 303 of acquiring waveforms for each part for both groups (the known good and bad parts). Method 300 continues with a step 304 of identifying relevant waveforms and/or features in the spectrums for comparing variation within a group and then between the two groups. Finally, method 300 concludes with a step 305 of using/applying AST algorithms for studying any differences between these two groups.

EXAMPLE

The AST system can vibrate a part over a very wide range of frequencies (1 Hz-20,000 kHz). However, the resonances that can be used for production sorting of parts typically reside in a much smaller frequency range and are dependent on the elastic modulus, mass, and geometry of a part. For each type of part, a unique broadband must be established. A broadband is created by selecting a usable range of frequencies. This frequency range is determined by reviewing resonance spectrum associated with a set of sample parts. The criteria for selecting start and end frequencies for a broadband are typically based on the quantity and quality of resonances present.

Figure 4:
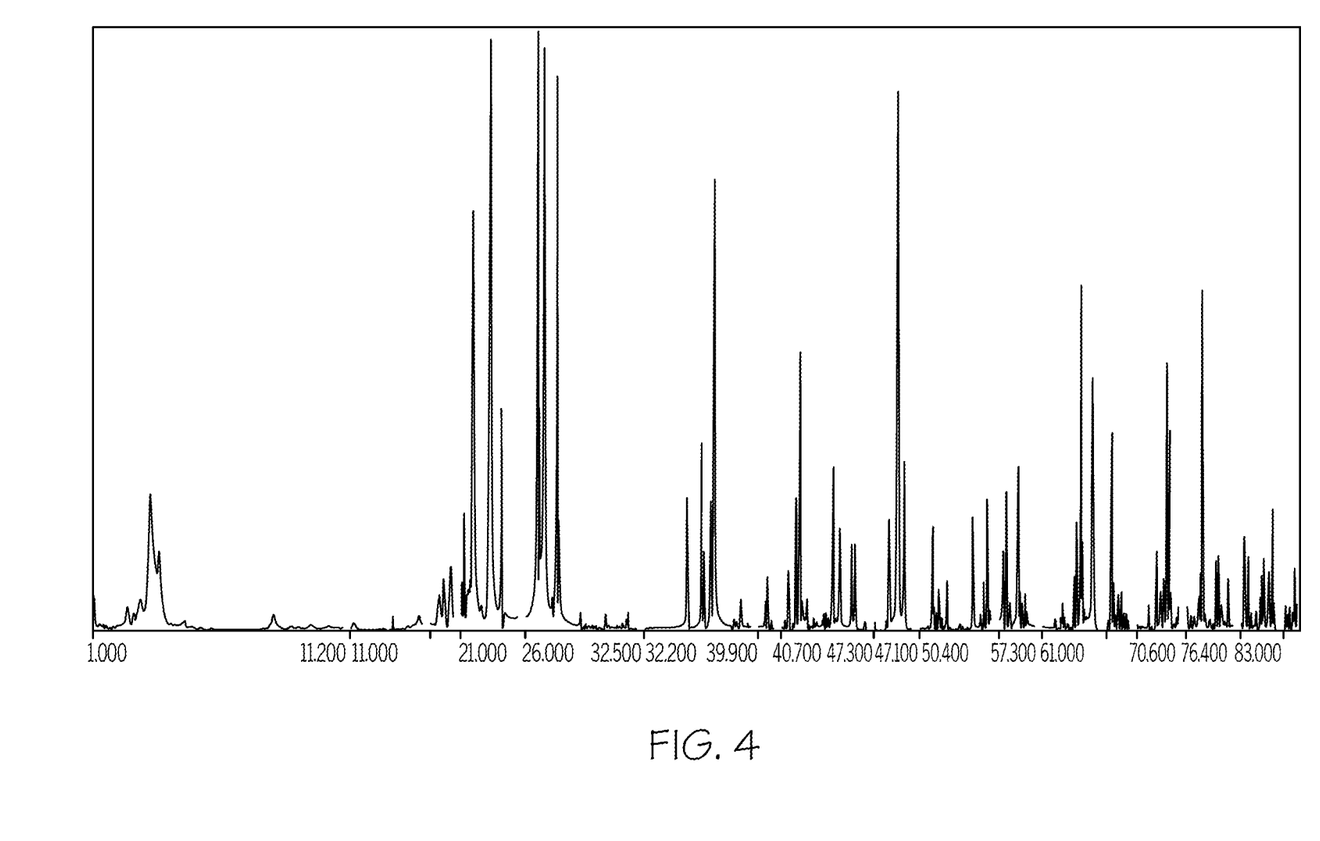
FIG. 4 depicts an exemplary broadband range used in NDE of an exemplary bladed disk.

A sample BLISK was used to establish a broadband. The broadband range used in this project was 1-91.2 kHz and is shown in FIG. 4 (step 301, above). The resonance waveforms for 66 acceptable rotors and 15 unacceptable rotors were logged into the database (steps 302 and 303 above).

After all rotors were logged, the AST software was used to inspect the resonance peak selection (steps 304 and 305, above). Careful analysis of each band was performed to make sure that the peaks selected were correctly aligned. The software was then used to establish a sort between the "good" and "bad" rotors. This sort was then validated.

Figure 5:
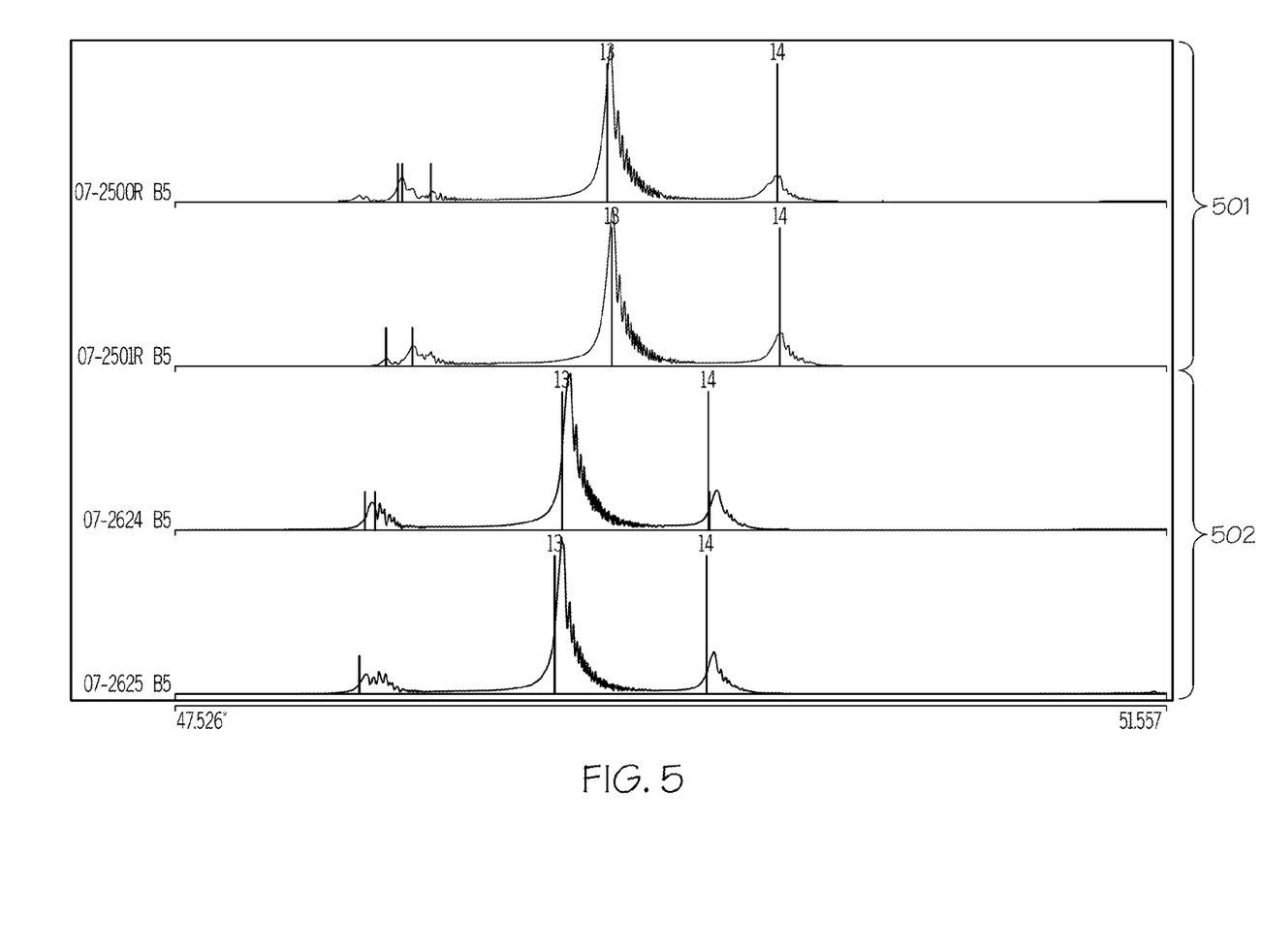
FIG. 5 depicts a comparison between the waveform features of a bladed disk that does not include any flaws and a bladed disk that includes at least one flaw.

Shown in FIG. 5 replace with the brazed part or include is an example of some of the resonance data for two of the "good" BLSIKs (area 501) and two of the "bad" BLISKs (area 502). The magenta colored lines indicate significant resonance peaks. Notice how the resonance peaks for "bad" BLISKs are shifted slightly to the left in comparison to the "good" BLISKs. This shifting of peaks is a typical indication of a difference of the spectra waveform for parts.

Figure 6:
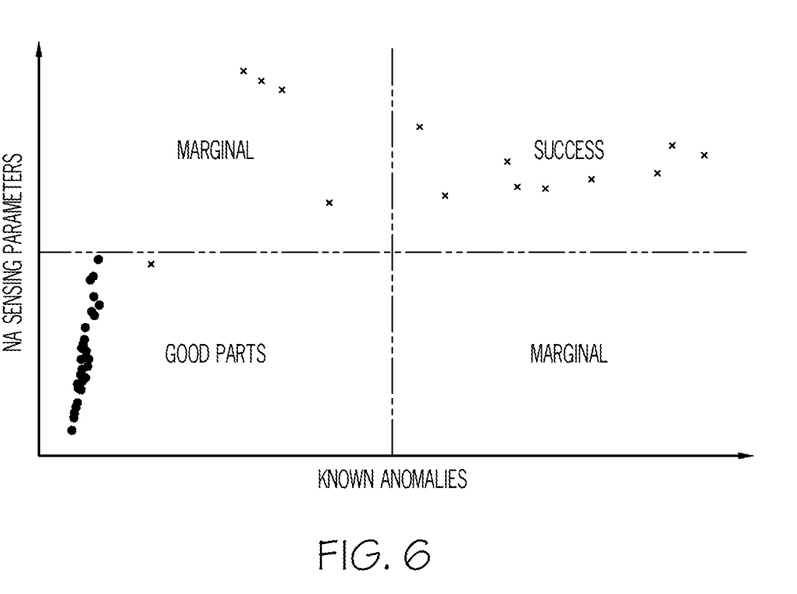
FIG. 6 depicts a range of analysis features including power spectrum, bispectrum, coherence spectrum, and FFT transformed using different tools from a plurality of non-flawed components and a plurality of flawed components.

The resonance difference is used by the AST system to inspect parts and classify (sort) them as good or bad. As shown in FIG. 6, the AST algorithm is able, using the input data from known good and bad parts, to create and identify a range of spectra waveform that corresponds with "good" parts (shown as area 601) and "bad" parts (shown as area 602). Using this data, NDE can be performed on solid state joined parts during manufacturing using AST, and the part can be identified as a good part or a bad part based on the resonance and the AST algorithms applied thereto. An operator can easily determine, using a plot such as FIG. 6, whether the part falls into the category of a good part or a bad part.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for non-destructively evaluating a joined component, comprising:
   providing the joined component that comprises either a dual-alloy component or a solid-state joined component;
   inducing vibrations in the joined component within a range of acoustic frequencies by placing a first transducer along a joint of the joined component, wherein inducing vibrations within a range of acoustic frequencies comprises inducing vibrations within a range of frequencies that is a subset of the range of frequencies from 20 Hz-20 kHz;
   acquiring waveforms or fast Fourier transforms (FFT) or both as a resonance spectra from the joined component resulting from the induced vibrations by placing a second transducer along the joint of the joined component; and
   analyzing the resonance spectra using process compensated resonant testing/acoustic sensor testing (AST).

2. The method of claim 1, wherein evaluating the component joined by solid state joining comprises evaluating a component joined by bonding, fusion, HIP, brazing, or welding.

3. The method of claim 1, wherein inducing vibrations includes generating a tone burst or gated sine wave, or swept amplitude sine wave.

4. The method of claim 1, wherein inducing vibrations within the subset of frequencies comprises inducing vibrations within a subset of frequencies that is determined at least in part based on properties, dimensions, and geometry of the joined component.

5. A method for non-destructively evaluating a sample joined component, comprising:
   acquiring a part response—waveform or fast Fourier transforms (FFT) or both as resonance spectra components within an acoustic frequency range, that being 20 Hz to 20 kHz, for each of a first plurality of solid-state or dual-alloy joined components that include at least one joining flaw and of a second plurality of solid-state or dual-alloy joined components that do not include joining flaws;
   analyzing the part response from the first and second plurality of joined components using process compensated resonant testing/acoustic sensor testing (AST) to differentiate the spectra of joined components that include a flaw and joined components that do not include a flaw; and
   comparing a response of a sample joined component against the analyzed response to determine whether the sample joined component includes a flaw.

6. The method of claim 5, wherein evaluating the component joined by solid state joining comprises evaluating a component joined by bonding, brazing, or welding.

7. The method of claim 5, wherein acquiring a resonance spectra includes generating a swept amplitude sine wave or toneburst signal generator or gated sine wave.

8. The method of claim 5, wherein the joining flaw includes one or more of a crack, void, porosity, shrink, inclusion, discontinuity, grain and crystalline structure difference, density related anomaly, heat treatment variation, material elastic properties difference, or residual stress and dimensional variation.

9. The method of claim 8, wherein the joining flaw is present as a result of a manufacturing process of the joined component.

10. A method for non-destructively evaluating a solid state joined component, comprising:
    providing a plurality of acoustic sensors along a solid state joint of the joined component, the joined component being either a dual-alloy component or a solid-state joined component;
    inducing vibrations in the joined component within a range of acoustic frequencies using at least a first of the plurality of acoustic sensors, wherein inducing vibrations within a range of acoustic frequencies comprises inducing vibrations within a range of frequencies that is a subset of the range of frequencies from 20 Hz-20 kHz;
    sensing a response in terms of waveforms or fast Fourier transforms (FFT) or both of the induced vibrations using at least a second of the plurality of acoustic sensors; and
    analyzing the resonance frequencies using process compensated resonant testing/acoustic sensor testing (AST).

11. The method of claim 10, wherein evaluating the solid state joined component comprises evaluating a component joined by bonding, brazing, or welding.

12. The method of claim 10, wherein inducing vibrations includes generating a swept sine wave.

13. The method of claim 10, wherein inducing vibrations within the subset of frequencies comprises inducing vibrations within a subset of frequencies that is determined at least in part based on an elastic modulus, a mass, or a geometry of the joined component.

* * * * *